United States Patent [19]

Hering

[11] Patent Number: 4,690,848

[45] Date of Patent: Sep. 1, 1987

[54] WEATHER-RESISTANT LIGNOCELLULOSE OR OTHER ORGANIC OR INORGANIC MATERIAL BOARDS AND PROCESS FOR THEIR PRODUCTION

[76] Inventor: Reinhard F. Hering, via Alberedo 34, CH 6645 Brione Sopra Minisio, Switzerland

[21] Appl. No.: 785,198

[22] Filed: Oct. 7, 1985

Related U.S. Application Data

[63] Continuation-in-part of Ser. No. 434,834, Oct. 14, 1982, Pat. No. 4,562,103, which is a continuation-in-part of Ser. No. 74,669, Oct. 23, 1979, abandoned.

[51] Int. Cl.$^4$ ............................................... B32B 1/04
[52] U.S. Cl. ...................................... 428/74; 428/282; 428/283; 428/284; 428/285; 428/290; 428/326; 428/402; 428/496
[58] Field of Search ................... 428/76, 283, 326, 74, 428/284, 285, 282, 496, 402, 290

[56] References Cited

U.S. PATENT DOCUMENTS 4,562,111 12/1985 Ogawa ................................ 428/492

Primary Examiner—James J. Bell
Attorney, Agent, or Firm—Marcus & Associates

[57] ABSTRACT

Weather-resistant boards are provided herein which are possessed of surface elasticity and pliancy by means of a permanently elastic, covering layer (for example, particle boards, facade covering boards, and wall elements) and mouldings (for instance, containers, vessels, prefabricated building elements, and roof elements), the base material being lignocellulose or other organic materials and/or inorganic materials, either as fibres or as particle materials. Such weather resistant boards consist of three layers. The first layer is an impregnatable porous, base material as defined above. The second layer is a vulcanized outer covering layer constituted by an vulcanized, weather-resistant resilient synthetic elastomeric material which has been vulcanized therein in situ at a temperature of at least 175° C. The third layer is the outer originally unvulcanized resilient synthetic elastomeric material, which is penetrated and impregnated below and into the same outer surface of the base material to be within the porous structure of the base material for only a predetermined limited region in the vicinity of the outer surface of the base material and being vulcanized therein in situ at a temperature of at least 175° C. The board is an integral united material, in which the base and the coating material are impregnated one into the other within a facing area.

17 Claims, 6 Drawing Figures

WEATHER-RESISTANT LIGNOCELLULOSE OR OTHER ORGANIC OR INORGANIC MATERIAL BOARDS AND PROCESS FOR THEIR PRODUCTION

RELATED APPLICATIONS

This application is a continuation-in-part of application Ser. No. 434,834 filed Oct. 14, 1982, now U.S. Pat. No. 4,562,103, which in turn is a continuation-in-part of application Ser. No. 74,669, filed Oct. 23, 1979, now abandoned.

BACKGROUND OF THE INVENTION (i) Field of the Invention

This invention relates to a method for the production of weather-resistant boards and to the weather-resistant boards so produced.

(ii) Description of the Prior Art

Many wood fibre materials for the building industry are limited to interior use since they are not sufficiently weather resistant to be used externally. However, since these products, i.e., particle boards, fibre boards, insulating boards, plywood, etc. are considered to be ideal and inexpensive building materials because of their economy, their insulation properities and their lightness, the art has been faced with the problem of providing the necessary weather resistancy and aging stability by altering the nature and composition of the raw materials and binding agents as well as by applying a coating to the outer skin. The first aim is not only to prevent water from penetrating into the board, but also to keep off atmospheric humidity. Any attempts to solve this problem solely by the type of and modification of, the usual glue mixtures, and by adding hydrophobic agents and/or anti-bacterial agents, have not provided any reliable results, since it was also desired that the positive properties of the material, e.g. low costs, light weight, heat insulation, bursting strength and standard glueing, be retained. Such properties are impaired when, for instance, too large quantities of binding materials or mineral admixtures are used, which were expedients recently attempted to achieve sufficient weater resistancy. Therefore, measures heretofore used to provide such weather resistance of the structural composition within limits are coupled with an effective surface protection.

Accordingly, up to the present time, neither materials nor methods have been found which would guarantee that the required long lasting protection would remain effective against atmospheric influences to maintain the board resistant to mechanical damage or destruction within an acceptable economic scope. In this respect, coating the board by liquid preserving agents is becoming more obsolete, since the industry has been successful in developing products which have high resistance to moisture, UV radiation and heat radiation, etc. and which avoids to a large extend cracking or embrittlement. Another economic process has been provided in which synthetic-resin-soaked papers are pressed on during the standard production of boards or mouldings. This, however, results in thin and susceptible surface coatings which are liable to crack because of the brittleness of the material as soon as the base material expands. This danger would be overcome by laminating previously produced weather-resistant, impact-resistant, and crack resistant materials, e.g., sheet metals, asbestos cement, or synthetic foils to the board. These, however, might peel off under the permanent strain of the influence of the weather as the differences of the expansion-coefficients due to heat radiation result in the destruction of the glue joint and cause blistering.

Many proposals have been made to solve such problems. For example, Harvey et al, U.S. Pat. Nos. 1,776,790, patented Sept. 30, 1930; Clements, 2,402,731, patented June 25, 1946; Page, 2,694,233, patented Nov. 16, 1954; Elmsdorf, 3,332,193, patented July 25, 1967; and Tellman, 4,190,041, patented Aug. 22, 1978 all show various suggestions in the prior art which have not solved the problem.

Strobel, U.S. Pat. No. 1,955,984, patented Aug. 24, 1934, taught a weatherproof board having an integrated fibrous material base, an intermediate resilient layer secured only to the outer face of the base, and a facing of vulcanized rubber secured only to the intermediate layer.

Flanders, U.S. Pat. No. 4,127,636 patented Nov. 28, 1978 provided a reinforced board made of lignocellulose particles in which lignocellulose fibres were first mixed with short fibres (to cause randem orientation) with a binder and with a wax addition and finally with reinforcing filaments (e.g. glass fibre or steel wires). Then the entire mixture was is moulded under pressure.

McTague, U.S. Pat. No. 2,125,847 provided a moulded laminated article including pre-formed lamina of high resin content fibre board integrally united to a pre-formed lamina of a composition comprising a halogen - containing rubber derivative, e.g. a sunlight embrittling composition Accordingly, up to the present time, no method exists for coating the surface of wood-fibre materials, plywood materials or other fibre materials, even those which have previously been made moisture resistant to the greatest possible extent, with an insoluble layer.

SUMMARY OF THE INVENTION (i) Aims of the Invention

Thus, aims of the present invention are to provide such a building board which is economical to produce; which is resistant to weather influences; which is substantially non-ageing; which can follow all fluctuations of the base material without significant embrittling or cracking; which shows high abrasion-resistance; which has impact resistant capacities to mechanical influences of any kind; and which has been made substantially non-inflammable, if required.

(ii) Statements of the Invention

This invention provides a weather-resistant board possessed of surface elasticity and pliancy by means of a permanently elastic covering layer comprising: an impregnatable porous base material comprising either a lignocellulose or other organic fibrous or particle material, or an inorganic mineral fibrous or particle material, or a mixture of such organic and inorganic materials; and a vulcanized elastic covering layer constituted by a vulcanized, weather-resistant, synthetic elastomeric material vulcanized thereon in situ at a temperature of at least 175° C.; the vulcanized outer material being both adhered securely to one outer surface of the base material, and, in unvulcanized form, being penetrated and impregnated below and into the same outer surface of the base material for only a predetermined limited region in the vicinity of the outer surface of the base material to be within the porous structure of the base material, and then being vulcanized therein in situ at a temperature of at least 175° C.

(iii) Other Features of the Invention

By another feature thereof, the vulcanized outer covering layer is adhered to two mutually opposed faces thereof.

By another feature thereof, the vulcanized outer covering layer completely encases the board.

By yet a further feature, the resilient, synthetic elastomeric material is a synthetic vulcanizable rubber.

By still another feature, the organic base material and/or the inorganic base material may also be admixed with an adhesive agent.

By another feature, the organic base material and/or the inorganic base material may be in precompressed form.

By another feature, the organic lignocellulose or other organic material may be fibres, chips or particles of wood or other plants.

By another feature, the inorganic material may be mineral wool, glass wool, glass fibres, or synthetic fibres.

By still another feature, the vulcanized outer covering layer is provided with a further surface coating.

By a still further feature, the further surface coating comprises aluminum powder, aluminum foil or color pigments.

By still another feature, the further surface coating is in the form of a relief ornamental structure.

By other features, the board may be either flat or in molded shaped form. Thus, the board may be molded by bending, whereby the elasticity and flexibility of the outer skin takes over the function of a hinge. The board may alternatively be formed as wall, roof, or other building elements, with openings herein for doors and/or windows. Still further, it may be formed as vessels or containers.

(iv) General Description of the Invention

As noted above, the provision of weather-resistant boards or mouldings of particle board, fibre board or plywood materials of this invention is based on the fact that, for a long time, natural rubber has proved to be reliable as a weather-and moisture-resistant coating material. The natural rubber which was originally used in the prior art is, according to the present invention, replaced by synthetic rubbers, thus improving the application properties. By adding stabilizing agents and further additives, the brittleness and cracking under the influence of rain, ozone, light radiation, UV radiation and heat radiation has been substantially reduced so that today, for instance, roof films of synthetic rubber are expected to last 50 years without any damage. The highly useful products of the group of synthetic elastomers especially with regard to elasticity, and/or abrasion resistance may be modified beyond their specific characteristics by altering the chemical composition and the type or quantity of added filling materials. The outer coating of the particle board first of all has to meet the condition of protecting against destructive weather influences and mechanical damages. A double-faced coating can be provided for higher surface stability, or it may provide a hinge or protecting edges. The synthetic rubber should have the usual expansion characteristics of shrinkage without cracking. Therefore, a viscous synthetic rubber composition can be used, which will result in a protection layer of optimum impact resistance and abrasion resistance after the full vulcanization process. Furthermore, it may be reinforced by wood shearing fleece, and other tissue, as well as admixtures of other fibres and/or other metallic fibres.

The essence of the present invention, however, does not rely only on the use of highly weather-resistant synthetic rubber mixtures for the outer coating. The essence of this invention is the fact that this coating penetrates into the base material and thus results in an insoluble composition during the first and only production run, without the necessity of any binding medium in the form of adhesive agents. These weather-resistant boards or mouldings consist of a compound laminated material, ready for any use as wall elements or roof elements in the building industry, the boards being protected on one or several sides or even edge protected. They may also be formed into pressed containers or vessels suitable to keep and to transport therein liquids or other wet materials.

The method for the manufacture of these weather resistant boards or mouldings of the above described fibrous and/or particle materials is based on the interrelationship of the two following procedures, under interacting conditions, so that they are carried out substantially simultaneously:

1. Compressing of the fibrous and/or particle mixture of the base material and hardening of the adhesive agents optionally contained therein; and 2. Compressing and vulcanizing of the cover layer or layers coated mixture of synthetic rubber, or other elastomers, suitable filling materials and admixtures thereof.

The condensation and tempering or hardening of the resins and/or adhesive agents as well as the vulcanization takes place under suitable conditions of pressure, temperature (175° C.) and time. The duration of the vulcanizing temperature is dependent on accelerators and filling materials which may be present within the base material, and the thickness of the coating. These all vary and can be adjusted to the hardening period of the filling materials. The vulcanizing steps for the covering layers or layers on the one hand and the compressing of the base materials on the other hand, should be synchronized so that both processes may be carried out substantially simultaneously. Both material components are put into the shaping heat press tools together and in the selected order to match the structure of the finished compound material and are processed in one and the same manufacturing run to the final board-like compound material or mouldings with weather resistant outer skins. For this method, the same tools and plant installations can be used as are required or as one already available for the production of customary particle boards or mouldings.

In order to obtain an ordinary one-sided weather-resistant coated particle board, for instance in one specific embodiment, the outer coating is generally applied by spraying onto the mixture of fibre/particle/adhesive agents. The outer coating can be supplied either in prefabricated unvulcanized films, or built up successively by mechanically spraying, pouring, sprinkling and so forth, in the required quantity. After laying down on the batt and, if desired slightly pre-compressing it, the heat pressing follows and the further processing in the usual manner for the production of particle boards.

Of course, the method described herein may be carried out in a different sequence and with a different number and quantity of ingredients used, so that, for instance, the weather resistant cover layer, which is to be vulcanized, is coated or applied on last and on top of and/or on both sides respectively. Furthermore, the mixture of fibre-particles and adhesive agents, with or without additional heat, may undergo a separate pre-compression primarily in order to prepress a moulding before the mixture for the outer coating is put on and the final pressing follows.

Finally, according to further features of this invention, a decorating, reflecting or other surface coating or texture can be vulcanized onto the weather-resistant board. For instance, aluminum powder or foil, or colour pigments may be used either at the beginning or the end of the coating procedure an may be incorporated into the process. The weather-resistant surface may be given a relief ornamental structure provided the pressing tools have been fitted out accordingly.

This weather-resistant coating provided by vulcanization is not limited to compound materials or fibre, or particle-like base materials, since it may be used for plywood or wooden strip boards and in principle also on several outer surfaces and even only partly on the surface. Finally, also other lignocellulose-containing or other organic or inorganic, i.e. mineral-containing base materials may be used herein provided they can receive a weather-resistant outer coating of unvul- canized synthetic rubber or other elastomers and may be manufactured into boards or mouldings.

BRIEF DESCRIPTION OF THE DRAWINGS

In the accompanying drawings.

Figure 1:
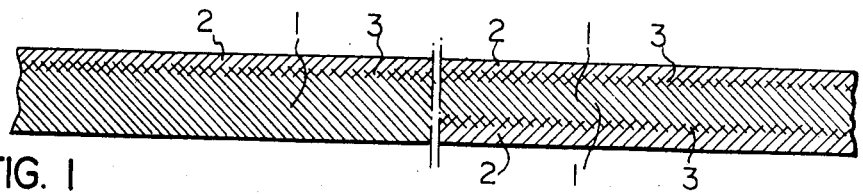
FIG. 1 is a section of two forms of weather resistant boards of embodiments of this invention.

DESCRIPTION OF PREFERRED EMBODIMENTS (i) Description of FIG. 1

As seen in FIG. 1, the left hand side shows, in cross-section, an upper-coated weather-resistant board while the right hand side shows in cross-section, a double-faced coated weather resistant board. The base material 1 consists essentially of lignocellulose-containing fibres and/or particles and/or the mineral-containing fibres and/or particles/adhesive agents mixture, and the outer coating 2 consists essentially of a weather-resistant, vulcanizable synthetic rubber mixture. The outer coating 2 is both adhered to the outer surface of the base material 1 and penetrates and impregnates into the base material 1 at the region 3 i.e. for only a predetermined limited region in the vicinity of the outer surface 2 of the base material 1. Thus, the weather-resistant board comprises an integral uniting of the base material 1 and the synthetic rubber coating 2 after the synthetic rubber coating 2 has been vulcanized.

Figure 2:
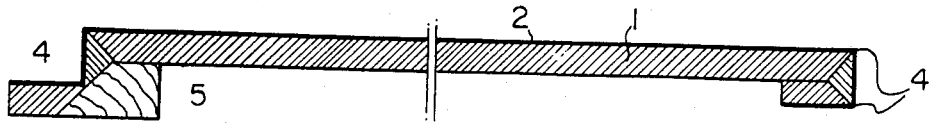
FIG. 2 is a section of a board of an embodiment of this invention in the form of a facia board.

(ii) Description of FIG. 2

FIG. 2 shows, in cross section, the weather-resistant board of this invention in the form of a base material 1 and a vulcanized outer synthetic rubber layer 2. The board is shown as being bent completely around (at the right hand side) so that the outer synthetic rubber layer 2 extends around the side edges and portion of the bottom. The elasticity of the outer synthetic rubber layer enables the corners 4 to act as hinges.

On the left hand side, the board is shown as being bent to form a step, with the elasticity of the synthetic rubber outer coating enabling the outer and inner corners 4 to act as hinges. If necessary, a wooden slat 5 can be secured to the inner face behind the step.

Figure 3:
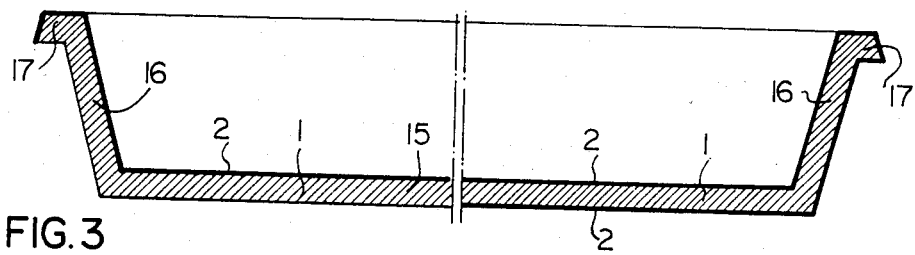
FIG. 3 is a section of a board of two other embodiments of this invention in the form of shaped vessels.

(iii) Description of FIG. 3

In FIG. 3, a premolded vessel having the cross-section of a bottom 15, side walls 16 and a rim 17 is provided formed of the single faced board consisting of the base material 1 and the outer coating 2 (shown on the left hand side), or alternatively of the double faced board consisting of the base material 1 and the outer synthetic rubber coatings 2 (shown on the right hand side). After or during the molding operation, the rubber surface 2 is vulcanized.

Figure 4:
FIG. 4 is a section of a board of another embodiment of this invention including a window opening therein.

(iv) Description of FIG. 4

The board in FIG. 4 is shown in the form of a pre-molded prefabricated building element for use in a wall having a profile consisting of main wall portion 18, edge portion 19 and a window opening 20.

Figure 5:
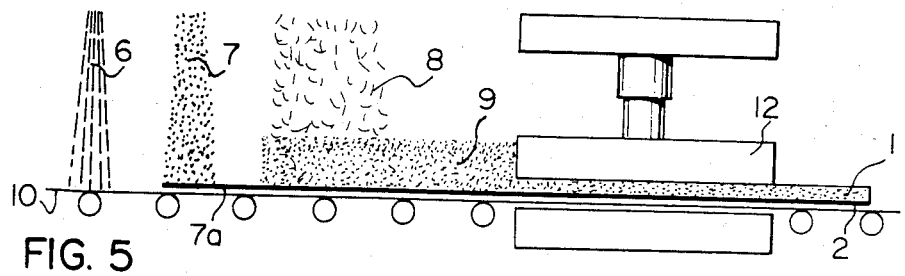
FIG. 5 is a schematic flow diagram illusting the method of producing the board of one embodiment of this invention.

(v) Description of FIG. 5

FIG. 5 provides a description of the method for the manufacture of weather-resistant boards and mouldings according to an embodiment of this invention. A parting agent (e.g. talc in powdered form) is first applied, as by spraying, onto the charging platform 10. Then a granulated mixture of the unvulcanized synthetic rubber 7 is applied, and finally a mixture of fibre and/or particle material/adhesive agents 8 is applied thereon, to provide an uncompressed batt 9, having an unvulcanized synthetic rubber film 7a on one face thereof. The batt 9 is subjected to compression and heat (at least 175° C.) on the hot press 12. This simultaneously provides a condensation of the adhesive agents in the fibre particle mixture 1 and vulcanization of the weather-resistant vulcanizable outer synthetic rubber coating 2. The outer synthetic rubber coating 2 penetrates and is impregnated into the base material 1 and this results in the integrated, united board as described in FIG. 1.

Figure 6:
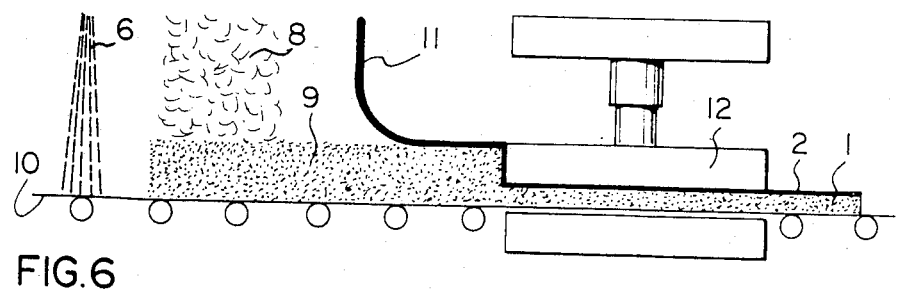
FIG. 6 is a schematic flow diagram illustrating the method of producing the board of another embodiment of this invention.

(vi) Description of FIG. 6

FIG. 6 shows another aspect of an alternative manufacturing method of this invention. Here the parting agent 6 is first sprayed onto the charging platform 10. Then the fibres and/or particle material/adhesive mixture 8 is applied to form a batt 9. Finally the outer synthetic rubber coating is applied on the form of an unvulcanized film of rubber 11. The further processing is the same as described for FIG. 5.

SUMMARY

From the foregoing description, one skilled in the art can easily ascertain the esential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

What I claim is:

1. A weather-resistant impregnated board possessed of surface elasticity and pliancy by means of a permanently elastic covering layer comprising: an impregnatable porous base material selected from the group consisting of (a) an organic lignocellulose or other organic fibrous or particle material; (b) an inorganic mineral fibrous or particle material; and (c) a mixture of an organic lignocellulose or other organic fibrous or particle material and an inorganic mineral fibrous or particle material; and a vulcanized outer covering layer constituted by a vulcanized weather-resistant, resilient synthetic elastomeric material which has been vulcanized thereon in situ at a temperature of at least 175° C.; said vulcanized outer covering layer being both adhered securely to one outer surface of said base material, and when in unvulcanized form, penetrated and impregnated below and into the same outer surface of said base material to be within the porous structure of said base material for only a predetermined limited region in the vicinity of said outer surface of said base material, and being vulcanized therein in situ at a temperature of at least 175° C.

2. The weather-resistant impregnated board of claim 1 wherein said base material is a lignocellulose or other organic fibrous or particle material.

3. The weather-resistant impregnated board of claim 2 wherein said base material is fibres, chip or particles of wood or other plants.

4. The weather-resistant impregnated board of claim 1 wherein said base material is an inorganic mineral fibrous or particle material.

5. The weather-resistant impregnated board of claim 4 wherein said base material is mineral wool, glass wool, glass fibres or synthetic fibres.

6. The weather-resistant impregnated board of claim 1 wherein said base material is a mixture of an lignocellulose or other organic fibrous or particle material, and an inorganic mineral fibrous or partule material.

7. The weather-resistant impregnated board of claim 6 wherein said base material is a mixture of fibres, chips or particles of wood or other plants and mineral wool, glass wool, glass fibres or synthetic fibres.

8. The weather-resistant board of claim 1 wherein said vulcanized, outer covering layer is adhered to two mutually opposed faces thereof.

9. The weather-resistant board of claim 1 wherein said vulcanized, outer covering layer completely encases said board.

10. The weather-resistant board of claim 1 wherein said resilient, synthetic elastomeric material is a synthetic vulcanizable rubber.

11. The weather-resistant board of claim 1 wherein said base material is also admixed with a curable resin as an adhesive agent.

12. The weather-resistant board of claim 1 wherein said base material is in precompressed form.

13. The weather-resistant board of claim 1 which is in heat pressed form.

14. The weather-resistant board of claim 13, wherein said vulcanized outer covering layer is provided with a further surface covering selected from the group consisting of aluminum powder, aluminum foil, and color pigments.

15. The weather-resistant board of claim 1 wherein said vulcanized outer covering layer is provided with a further surface coating in the form of a relief ornamental structure.

16. The weather-resistant board of claim 1 in flat form.

17. The weather-resistant board of claim 1 in shaped molded form.

* * * * *